(12) United States Patent
Chan

(10) Patent No.: US 7,417,697 B2
(45) Date of Patent: Aug. 26, 2008

(54) WEATHER STATION

(75) Inventor: Raymond Chan, Hunghom (HK)

(73) Assignee: IDT Technology Limited, Kowloon, Hong Kong Sar (CN)

( * ) Notice: Subject to any disclaimer, the term of this patent is extended or adjusted under 35 U.S.C. 154(b) by 276 days.

(21) Appl. No.: 11/197,367

(22) Filed: Aug. 5, 2005

(65) Prior Publication Data

US 2007/0030425 A1 Feb. 8, 2007

(51) Int. Cl.
*G02F 1/1335* (2006.01)
(52) U.S. Cl. ..................... 349/114
(58) Field of Classification Search .............. 349/114
See application file for complete search history.

(56) References Cited

U.S. PATENT DOCUMENTS

| 4,548,475 | A | 10/1985 | Brendle et al. |
| 6,449,219 | B1 | 9/2002 | Hepp et al. |
| 6,532,048 | B1 | 3/2003 | Matsui |
| 6,912,018 | B2 * | 6/2005 | Faris et al. ................ 349/16 |

FOREIGN PATENT DOCUMENTS

| EP | 1 081 533 | 3/2001 |
| EP | 1 538 464 | 6/2005 |

* cited by examiner

*Primary Examiner*—James A Dudek
(74) *Attorney, Agent, or Firm*—Leydig, Voit & Mayer, Ltd.

(57) ABSTRACT

A weather station has an MCU for evaluating weather information relating to an atmospheric parameter, a sensor for sensing the parameter for subsequent processing by the MCU, and an LCD display. The LCD display has a multi-layered structure including front and rear glass plates, liquid crystal material located between the plates in a pattern having a number of parts, a foremost transmissive polarizer, and a transflective polarizer behind the rear glass plate. There is also a color backing behind the rear polarizer, which has a number of regions in different colors and cover the liquid crystal pattern parts, so that the color regions are selectively revealed through the parts of the pattern as the parts of the pattern of the liquid crystal material are activated, thereby displaying the weather information in color.

9 Claims, 4 Drawing Sheets

WEATHER STATION

BACKGROUND OF INVENTION

Weather stations having an LCD display for measuring and indicating weather information are of course known. The weather information is normally indicated using numbers on a greyish background on the display. Certain weather stations might incorporate a colour LCD display, but the manufacturing cost would be high as it involves handling of the three basic colour components i.e. red, blue and green.

The invention seeks to obviate or at least alleviate such a problem or shortcoming by providing a new or otherwise improved weather station.

SUMMARY OF THE INVENTION

According to the invention, there is provided a weather station for measuring and indicating weather information, comprising a housing, a control unit in the housing for operation and control including evaluating weather information relating to at least one atmospheric parameter, and at least one sensor associated with the control unit for sensing said atmospheric parameter for subsequent processing by the control unit to evaluate said weather information. A liquid crystal display controlled by the control unit displays said weather information evaluated by the control unit, which has a multi-layered structure comprising a pair of front and rear transparent substrates having respective rear and front surfaces held against each other, liquid crystal material located between the front and rear substrates in a predetermined pattern having a plurality of parts, a transmissive polarizer provided adjacent a front surface of the front substrate, and a transflective polarizer provided adjacent a rear surface of the rear substrate. There is also a colour backing provided behind the transflective polarizer, which has a plurality of regions in different colours which cover the parts of the liquid crystal material, such that the colour regions are selectively revealed through the liquid crystal parts as the parts are activated under the control of the control unit, thereby displaying said weather information in colour.

Preferably, at least some of the parts of the liquid crystal material are of shape representing features in the sky for displaying weather forecast.

More preferably, the control unit is operable to activate at least two adjacent parts of the liquid crystal material at different times to provide an animated display of weather forecast.

It is preferred that the features comprise the sun, a cloud, a raindrop and a snowflake.

It is further preferred that the features include the moon and a star.

In a preferred embodiment, the transflective polarizer comprises a RDF-C transflective polarizer.

Preferably, the regions of the colour backing have generally the same shapes as the parts of the liquid crystal material.

It is preferred that each region of the colour backing corresponds to one respective part of the liquid crystal material.

In one example, the colour backing is provided on a separate sheet held against a rear surface of the transflective polarizer.

In another example, the colour backing is printed on a rear surface of the transflective polarizer.

In a preferred embodiment, the liquid crystal display has adjoining first and second portions, the first portion being of the said multi-layered structure, the second portion being for displaying numerical weather information and having a similar structure as the first portion, sharing the front and rear substrates, except presence of the colour backing.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
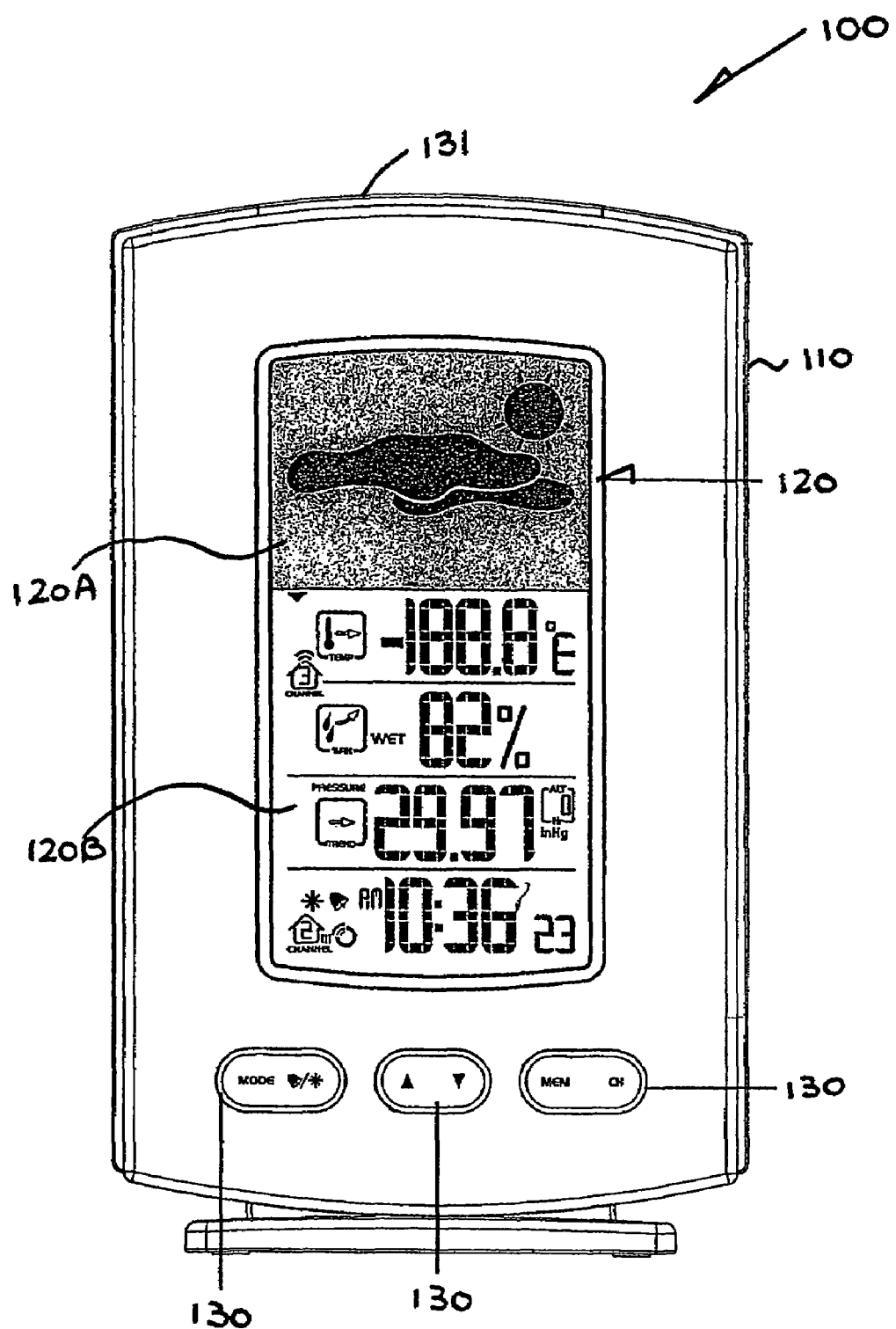
FIG. 1 is a front view of an embodiment of a weather station including a colour LCD display in accordance with the invention.
Figure 2:
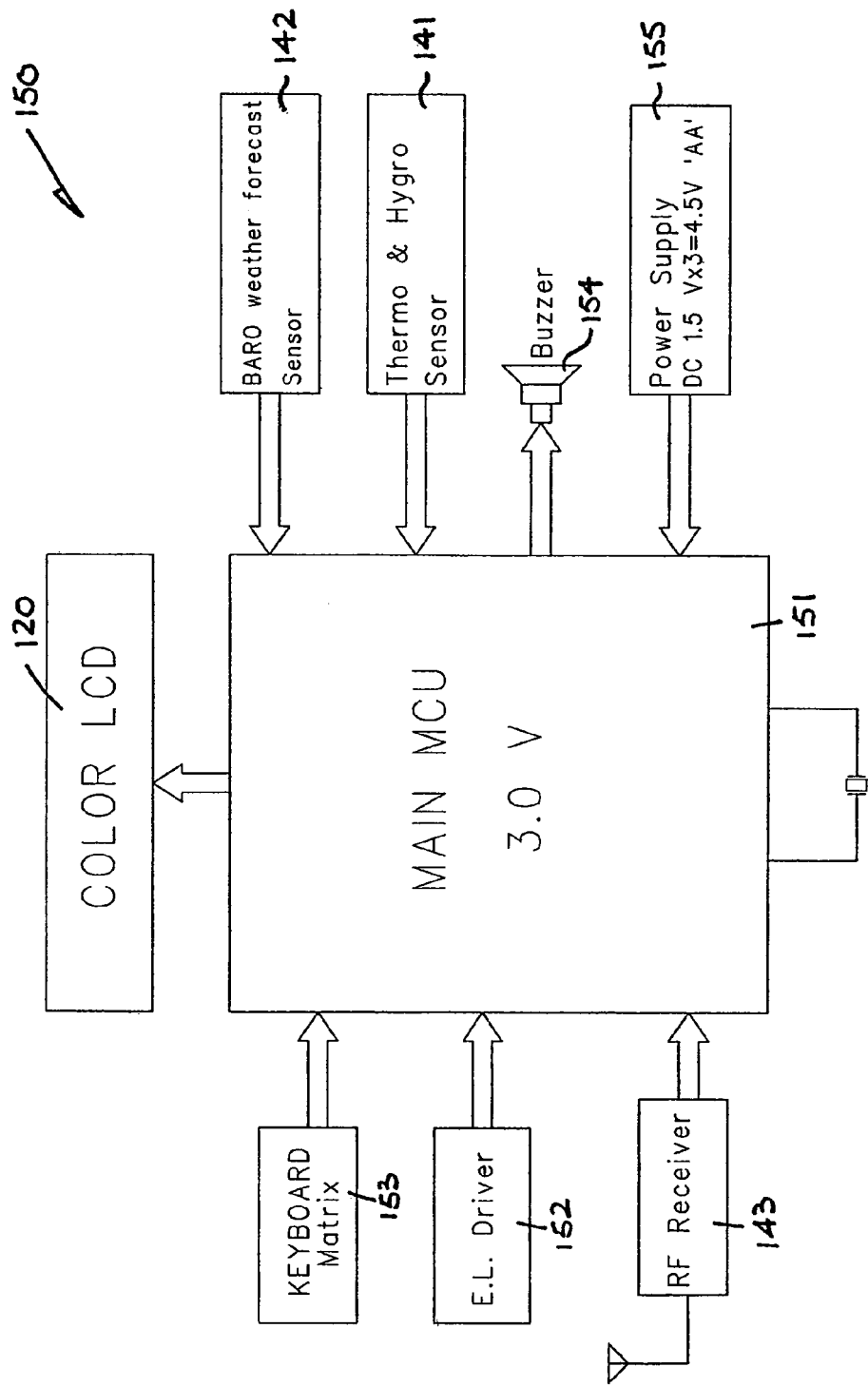
FIG. 2 is a schematic functional block diagram of an operating circuit of the weather station of FIG. 1.

Referring to the drawings, there is shown a weather station 100 embodying the invention for measuring and indicating weather information, which has an. upright generally flat housing 110 and a colour LCD display 120 with a row of three operating keys 130 located on a front side thereof. Inside the housing 110, there is an electronic operating circuit 150 built based upon an MCU (microprocessor control unit) 151 to perform various weather and clock operations.

A major function of the operating circuit 150 is to determine or evaluate weather information and condition relating to parameters of the atmosphere of various types including temperature, humidity, atmospheric pressure and weather forecast, and then to display/update the same on the LCD display 120. This is performed continuously or real-time, or at least at frequent regular intervals.

A number of weather sensors are employed to sense such atmospheric parameters for subsequent processing by the MCU 151. There are a composite thermo/humidity sensor 141 for sensing indoor temperature and humidity and a baro weather forecast sensor 142 for barometric pressure assessment and weather forecast, both of which are wired to the MCU 151 and located on or inside the housing 110.

Certain other sensors are placed at remote or outdoor locations, such as a thermo-hygro sensor for measuring outdoor temperature and humidity and a UV sensor for detecting the intensity level of solar UV radiation (for UV index). These remote sensors are associated with the MCU 151 by means of a wireless RF link that involves the use of a multi-channel RF receiver 143 (with antenna) connected to the MCU 151 in the housing 110. The receiver 143 also receives and synchronizes with the RF time/calendar signal broadcast by the local authority of the country or time zone concerned for showing the time/date on the LCD display 120.

The operating circuit 150 includes an electroluminescence (EL) driver 152 for driving an EL backlight panel located behind the LCD display 120 for illuminating the same, Also included are a keyboard matrix 153 that implements the operating keys 130 and some other keys such as a snooze/backlight 131 atop the housing 110, and a piezo-electric buzzer 154 for generating audio signals such as alarms and key-press sound. A power supply circuit 155 including three AA-sized battery cells powers the operating circuit 150.

The colour LCD display 120 has a multi-layered structure, having a multi-colour upper portion/display 120A for displaying weather forecast in colour and a monochrome lower portion/display 120B adjoining the upper display 120A for displaying numerical weather information about temperature, humidity and pressure.

In general, the LCD display 120 is formed by a pair of front and rear glass plates (transparent substrates) 121 and 122 stacked together with their respective rear and front surfaces lying against each other, liquid crystal material located therebetween (trapped in patterned recesses carved in the rear glass plate 122), and a transmissive polarizer (film) 123 attached on the front surface of the front glass plate 121. These three layers 121 to 123 are shared by both displays 120A and 120B, thereby forming an integrated display module 120.

The monochrome display 120B includes a transflective polarizer (film) 124 attached on the lower portion of the rear surface of the rear glass plate 122. For the colour display 120A, there are an RDF-C transflective polarizer (film) 125 attached on the upper portion of the same surface of the rear glass plate 122 and a matching sheet of colour backing 126 attached on the rear surface of the RDF-C transflective polarizer 125. The two transflective polarizers 124 and 125 together cover the entire rear surface of the rear glass plate 122. The monochrome display 120B has a similar structure as the colour display 120A, except presence of the colour backing 126.

The liquid crystal material of the monochrome display 120B is arranged into four rows of small parts as 7-segment digits and suitable icons for indicating temperature, humidity, atmospheric pressure and time, as shown in FIG. 1. The transflective polarizer 124 has its entire rear surface covered by a reflective coating. It is of the type generally known as positive polarizers such that it normally permits reflection of front incident light back by its rear coating but, upon activation of the relevant liquid crystal digit and/or icon segments (by the electric field of an applied voltage), it blocks off such reflection so that the activated liquid crystal segments appear black to indicate the relevant information.

Figure 3:
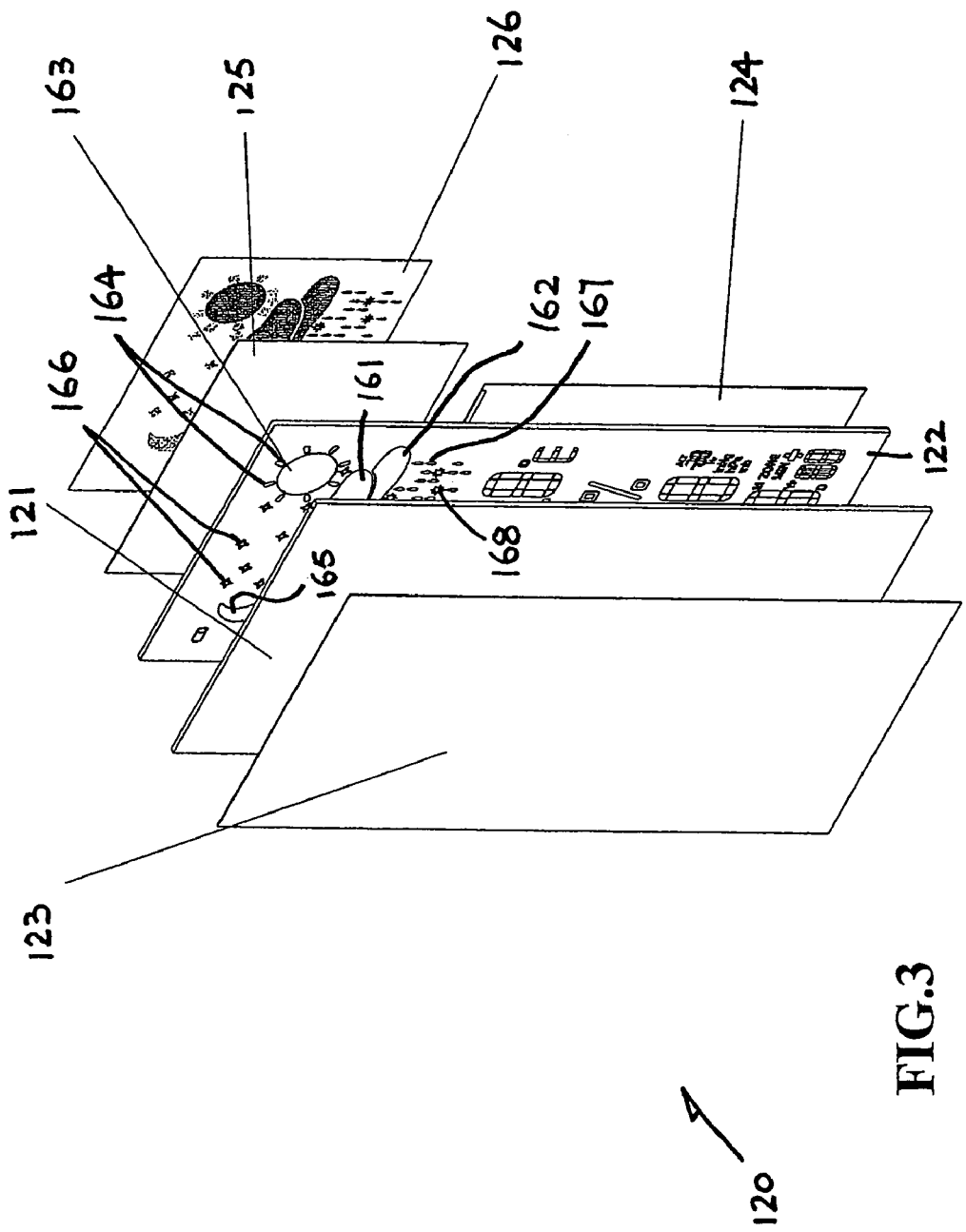
FIG. 3 is a parts-exploded perspective view of the colour LCD display of FIG. 1.

The liquid crystal material of the colour display 120A is also arranged into a predetermined pattern of separate parts, but these parts are shaped to represent features in the sky for weather forecast indication. These sky or heavenly features are front and rear clouds 161 and 162, a sun 163 with separate rays 164 around it above the clouds 161 and 162, a moon 165 with scattered stars 166 also above the clouds 161 and 162, columns of raindrops 167 below the clouds 161 and 162, and rows of snowflakes 168 also below the clouds 161 and 162, as shown in FIG. 3.

The colour backing 126 is printed with all such heavenly features, of the same shapes albeit slightly larger, in separate regions of different colours, namely the front cloud 161 in blue, the rear cloud 162 in orange, the sun 163 and rays 164 in red, the moon 165 and stars 166 in yellow, the raindrops 167 in blue, and the snowflakes 168 also in blue. These coloured regions completely cover, and preferably, but not necessarily, have generally the same shapes as and are aligned with, the corresponding liquid crystal parts of the colour display 120A, with each region corresponding to one respective liquid crystal part.

The RDF-C transflective polarizer 125 belongs to the type generally known as negative polarizers but it has a bright background as opposed to a dark background. The polarizer 125 normally blocks off reflection of front incident light back by a rear coating thereof but, upon activation of the relevant liquid crystal parts, it permits such reflection so that the corresponding coloured regions of the backing 126, i.e. heavenly objects in colour, are uncovered and thus become visible to indicate the forecast weather condition.

The specific liquid crystal parts to activate, and hence the corresponding coloured heavenly objects to reveal, are controlled and selected by the MCU 151. According to the trend of change in atmospheric pressure (and also temperature as necessary) over a certain period of time, it is possible to ascertain the current weather condition and predict the forthcoming weather condition. For this purpose, the MCU 151 is programmed based on an appropriate algorithm to identify the forecast/current weather condition by way of the heavenly objects.

Figure 4:
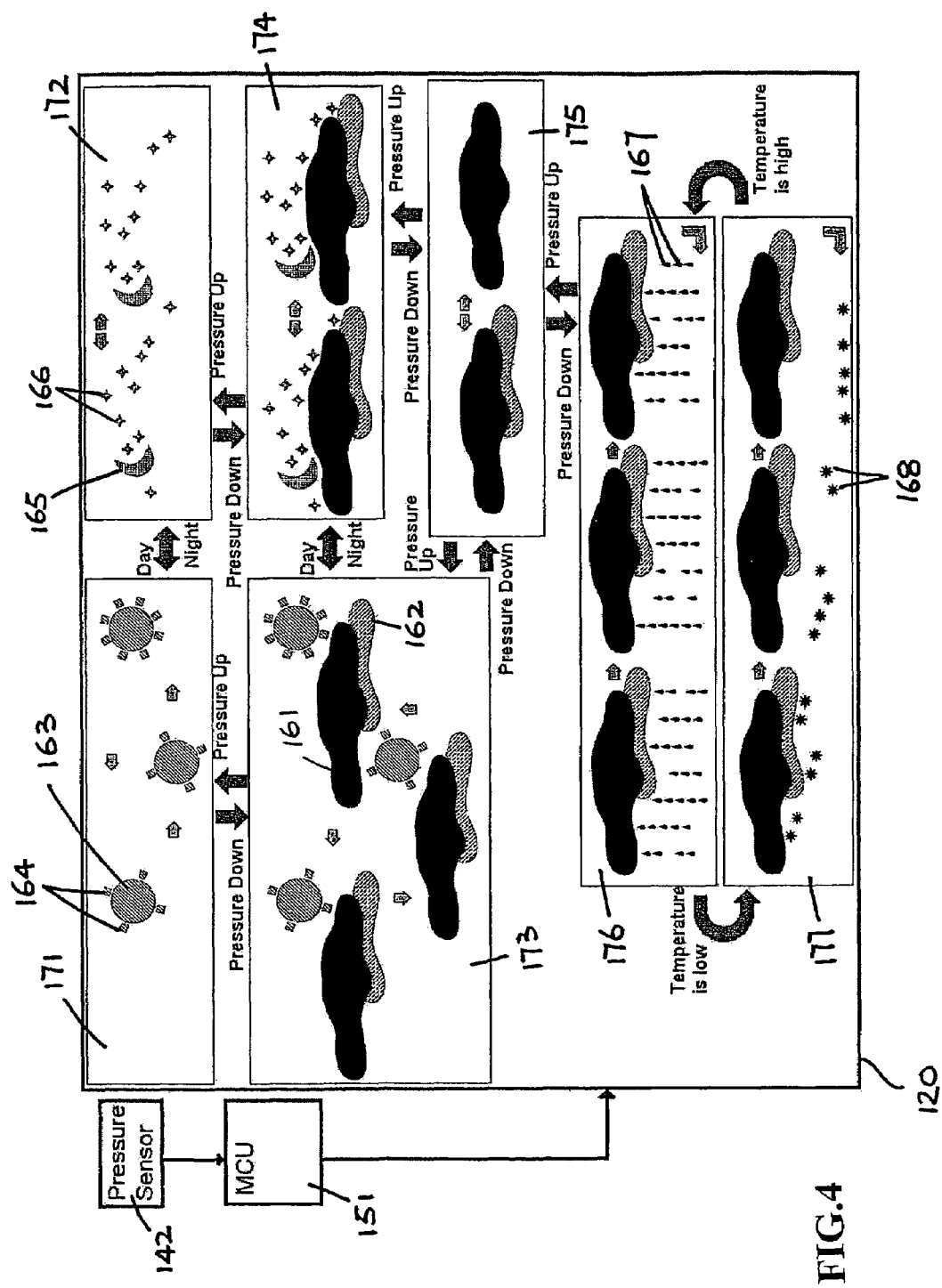
FIG. 4 is a schematic diagram that illustrates animated weather conditions shown on the LCD display of FIG. 1.

The weather condition display is illustrated in FIG. 4. Box 171 shows a sunny day condition using the sun 163 with the rays 163 which flash alternately, i.e. every other rays around the sun, to offer an animated display. Box 172 shows a clear-sky night condition using the moon 165 with the stars 166 blinking as between two mixed groups again for animation. The partly cloudy. condition of box 173, including the clouds 161 and 162, appears when there is a significant pressure drop in the sunny condition, and box 174 shows the equivalent at night. The two clouds 161 and 162 of box 175, with the rear one flashing, represent a cloudy condition. Rainy or snowy condition is imitated by the flickering raindrops 167 or the descending snowflakes 168 under the clouds 161 and 162 of box 176 or 177.

In general, the animated effects are rendered by the MCU 151 activating the relevant liquid crystal parts at alternating or different times, preferably adjacent parts to mimic a gradual/smooth motion.

In this particular embodiment, the colour backing 126 is by a separate sheet, on which there are printed the various colour regions corresponding to the liquid crystal parts 161 to 168, held against the rear surface of the RDF-C transflective polarizer 125. For a reduced parts count, the colour backing/regions may be printed, in mirror image, directly onto the rear surface of the polarizer 125.

It is envisaged that the lower, numeric display 120B may adopt the same technology as the upper, graphic display 120A, such that temperature readings may be shown in red display and humidity readings in blue, for example.

The invention has been given by way of example only, and various other modifications of and/or alterations to the described embodiment may be made by persons skilled in the art without departing from the scope of the invention as specified in the appended claims.

The invention claimed is:

1. A weather station for measuring and indicating weather information, comprising:
   a housing;
   a control unit in the housing for operation and control including evaluating weather information relating to at least one atmospheric parameter;
   at least one sensor associated with the control unit for sensing the atmospheric parameter for subsequent processing by the control unit to evaluate the weather information; and
   a liquid crystal display controlled by the control unit to display the weather information evaluated by the control unit, the liquid crystal display having a multi-layered structure comprising:
      a pair of front and rear transparent substrates having respective rear and front surfaces with the rear surfaces of the front substrate being held against the front surface of the rear substrate, one of the surfaces being held against the other surface including a plurality of recesses having respective patterns,
      liquid crystal material located between the front and rear substrates in the recesses, a transmissive polarizer located adjacent the front surface of the front substrate, a transflective polarizer located adjacent the rear surface of the rear substrate, and a color backing located behind the transflective polarizer, so that the transflective polarizer is between the color backing and rear surface of the rear substrate, the color backing having a plurality of color regions in different colors opposite, covering, and in patterns corresponding to the patterns of the plurality of recesses so that the color regions are selectively revealed through the liquid crystal material as the liquid crystal material is activated under control of the control unit, thereby displaying the weather information in color.

2. The weather station as claimed in claim 1, wherein at least some of the patterns have a shape representing features in the sky for displaying a weather forecast.

3. The weather station as claimed in claim 2, wherein the control unit is operable to activate at least two adjacent patterns at different times to provide an animated weather forecast.

4. The weather station as claimed in claim 2, wherein the features comprise the sun, a cloud, a raindrop, and a snowflake.

5. The weather station as claimed in claim 4, wherein the features include the moon and a star.

6. The weather station as claimed in claim 1, wherein the color backing is located on a separate sheet held against a rear surface of the transflective polarizer.

7. The weather station as claimed in claim 1, wherein the color backing is printed on a rear surface of the transflective polarizer.

8. The weather station as claimed in claim 1, wherein the liquid crystal display has adjoining first and second portions, the first portion having the multi-layered structure, the second portion displaying numerical weather information and having a structure similar to the first portion, sharing the front and rear substrates, except for the color backing.

9. The weather station as claimed in claim 1 wherein the recesses are in the front surface of the rear transparent substrate.

* * * * *